(12) United States Patent
Rossato

(10) Patent No.: US 6,431,213 B1
(45) Date of Patent: Aug. 13, 2002

(54) INTERNALLY DIVIDED WATER PIPE AND DIVERTER VALVE THEREFOR

(75) Inventor: John Rossato, Home Hill (AU)

(73) Assignee: Havendraw Pty. Ltd. (AU)

(*) Notice: Subject to any disclaimer, the term of this patent is extended or adjusted under 35 U.S.C. 154(b) by 0 days.

(21) Appl. No.: 09/622,903
(22) PCT Filed: Apr. 7, 1998
(86) PCT No.: PCT/AU98/00233
  § 371 (c)(1),
  (2), (4) Date: Sep. 5, 2000
(87) PCT Pub. No.: WO99/51905
  PCT Pub. Date: Oct. 14, 1999
(51) Int. Cl.[7] ............................................... F16K 11/04
(52) U.S. Cl. ........................................ 137/863; 251/61.1
(58) Field of Search ........................... 137/863; 251/61.1, 251/901; 138/115

(56) References Cited

U.S. PATENT DOCUMENTS 3,998,392 A  * 12/1976  Clair ........................... 239/547
4,272,021 A  *  6/1981  Standal ............................ 9/54

FOREIGN PATENT DOCUMENTS

| AU | 52918/98 | 4/1998 |
| DE | 25 14 961 | 10/1976 |
| EP | 710 505 | 5/1996 |
| SU | 961-606 | 9/1982 |
| SU | 1393-356 | 5/1988 |

* cited by examiner

Primary Examiner—John Fox
(74) Attorney, Agent, or Firm—Hoffman, Wasson & Gitler, PC

(57) ABSTRACT

Pipe for crop irrigation—has inlet and outlet along length with internal flexible longitudinal dividing wall movable between first flow position and second position where fluid is unable to pass through outlet.

12 Claims, 4 Drawing Sheets

INTERNALLY DIVIDED WATER PIPE AND DIVERTER VALVE THEREFOR

FIELD OF THE INVENTION

This invention relates to an internally divided water pipe and/or to a diverter valve which can be attached thereto. The invention will be described with reference to its use in water irrigation, but it should be appreciated that the pipe can be used for other liquids, or even fluids.

BACKGROUND ART

In crop irrigation, long pipes are laid to convey water from a water supply to the field. The pipe can be one or more kilometers long and water outlets are spaced along the pipe. Smaller diameter hoses can be attached to the outlets and irrigation equipment can be attached to the hose.

These long pipes are also called "flumes". It is known to have flexible flumes which can be made from a rubberised canvas, flexible plastic, and the like. These flumes can be flattened and rolled up when not in use.

One current disadvantage with these extremely long pipes is that it is time consuming to open and close the various valves spaced along the length of the pipe, it being appreciated that the pipe can be several kilometers long.

OBJECT OF THE INVENTION

The present invention is directed to a pipe which can replace current pipes or flumes and where the fluid outlets or valves can be turned off from a central location without having to separately turn off each valve along the pipe.

The present invention is also directed to a diverter valve that can achieve this function.

It is an object of the invention to provide a pipe and/or a diverter valve which may overcome the abovementioned disadvantages and provide the public with a useful or commercial choice.

In one form, the invention resides in a pipe to convey a fluid, the pipe having at least one fluid outlet along its length, the pipe having an internal flexible longitudinal dividing wall which can move between a first flow position where fluid can pass along the pipe and through the said fluid outlet and a second position where fluid is unable to pass through the at least one outlet.

In this manner, the internal flexible dividing wall can be made to move between its first flow position where water can pass along the pipe and through one or more of the fluid outlets, and a second flow position where water can pass along the pipe but is prevented from passing through one or more of the outlets.

The internal dividing wall can be made to move between its positions by diverting water along one or the other side of the internal flexible dividing wall. If water is passed along one side of the dividing wall, the wall will allow water to pass through the outlets, while if the water is passed along the other side of the dividing wall, water is prevented from passing through the outlet.

The pipe can be made flexible such that it can adopt a "lay flat" configuration when not in use. The pipe can be made from any suitable material which can include polyethylenes, polypropylenes, laminated plastics, rubberised canvas, and the like. Of course, a rigid or substantially rigid pipe can also be used.

The pipe has at least one fluid outlet and preferably includes a number of outlets spaced along the pipe. These outlets may be fitted with stop valves and various coupling arrangements can be present to couple irrigation equipment to the pipe.

The internal dividing wall is flexible, and can be either flexible but substantially inextensible, or flexible and extensible (such that the internal dividing wall can stretch if required).

An advantage with having the internal wall flexible as opposed to rigid is that the wall can flex from one side of the pipe to the other side of the pipe. This means that when fluid flows along one side of the wall, the wall flexes such that almost the entire internal diameter of the pipe can be used. If the wall was rigid, this would result in an undesirable reduction in the available flow of water.

The internal wall can be formed by manufacturing a tube of flexible pipe and attaching to the outside of the tube a longitudinal wall (an embodiment of which is illustrated in FIG. 3).

To move the internal wall, a diverter valve can be provided, and in another form of the invention, there is provided a diverter valve attachable to a pipe of the type having an internal flexible longitudinal dividing wall which can move between a first flow position where fluid can pass along the pipe and through the said fluid outlet and a second position where fluid is unable to pass through the outlet, the valve having a valve member which is attachable to an end of the dividing wall and which can move the end of the dividing wall between opposed sides of the pipe, thereby allowing fluid to selectively pass along each side of the dividing wall.

The diverter valve can pull an end of the dividing wall between upper and lower positions which divert water into each side of the pipe.

BRIEF DESCRIPTION OF THE DRAWINGS

An embodiment of the invention will be described with reference to the following drawings in which.

BEST MODE

Figure 1:
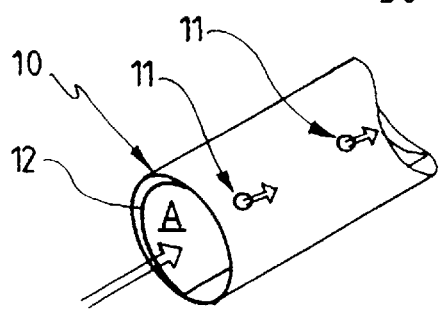
FIG. 1 illustrates a pipe having an internal wall which has been moved to one side of the pipe to allow water to pass through the pipe and through a series of outlets spaced along the pipe.
Figure 2:
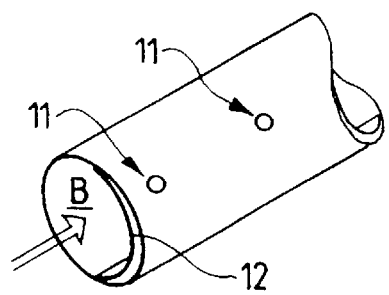
FIG. 2 illustrates the pipe of FIG. 1 where the internal wall has been moved to the other side of the pipe to prevent water from flowing through the outlets.

Referring to the drawings and initially to FIGS. 1 and 2, there is shown a pipe 10. Pipe 10 in the embodiment is formed from flexible plastic and has an internal diameter of about 30 cm and a wall thickness of about 1–2 mm. Pipe 10 can be flattened and rolled up when not in use, and can be several kilometers long.

Openings 11 are spaced along the outer wall of pipe 10 and valves or other connections can be attached to opening 11.

Pipe 10 has an internal flexible longitudinal dividing wall 12. Wall 12 extends entirely along the inside of pipe 10 and can be made from the same flexible material as the pipe.

Internal wall 12 is flexible and can move between a first flow position illustrated in FIG. 1 where wall 12 is adjacent one side of pipe 10, and a second position illustrated in FIG. 2 where wall 12 has moved to the opposite side of pipe 10.

To allow this movement, wall 12 can be formed from stretchable material, although it is at this stage desired that the wall is formed from flexible substantially inextensible material, so the width of wall 12 will need to be longer than the internal diameter of pipe 10 to allow the wall to move between its positions.

One advantage of this movement of internal wall 12 is that the useable diameter of the pipe is virtually unchanged, and this is illustrated in FIGS. 1 and 2.

For instance, in FIG. 1, wall 12 has moved entirely to its one side and water can flow virtually through the entire internal diameter of pipe 10 and out openings 11.

However, when wall 12 is moved to its position illustrated in FIG. 2, water can still flow virtually along the entire internal volume of pipe 10, but wall 12 in the position of FIG. 2, prevents water from flowing through openings 11.

The internal dividing wall 12 is sealed adjacent its longitudinal edges such that water cannot pass from one side of wall 12 to the other side of wall 12 while flowing along the pipe.

Figure 3:
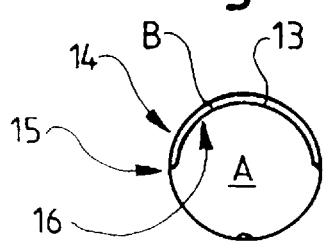
FIG. 3 is a section view showing one preferred manner of manufacturing the pipe.
Figure 4:
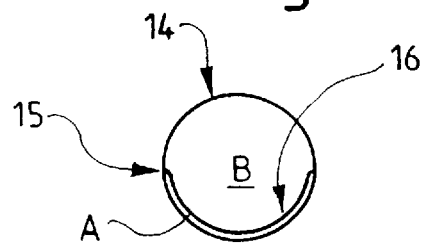
FIG. 4 illustrates the pipe of FIG. 3 where the internal dividing wall has moved.

FIGS. 3 and 4 illustrate one preferred way in which the divided pipe can be made. Referring to FIG. 3, a flexible tube 13 is formed and an outer longitudinal sheet 14 is attached to tube 13 at longitudinal edges 15. This, in essence, makes the top part 16 of tube 13 the internal flexible wall, and this is illustrated in FIG. 2 which shows wall 16 having moved to one of its positions.

Figure 5:
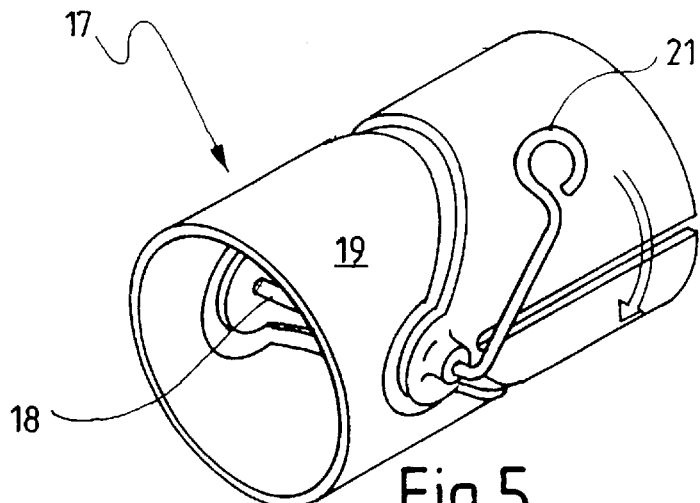
FIG. 5 shows a diverter valve according to an embodiment of the invention.

FIG. 5 illustrates a diverter valve 17 which is attached to one end of pipe 10 to divert water either along channel A or channel B (see FIGS. 1–4). Simply stated, diverter valve 17 pushes the flexible wall 12 between the positions illustrated in FIGS. 1 and 2 by attaching wall 12 to a valve member 18 (valve member 18 being internal and better illustrated in FIGS. 6 and 7).

Figure 6:
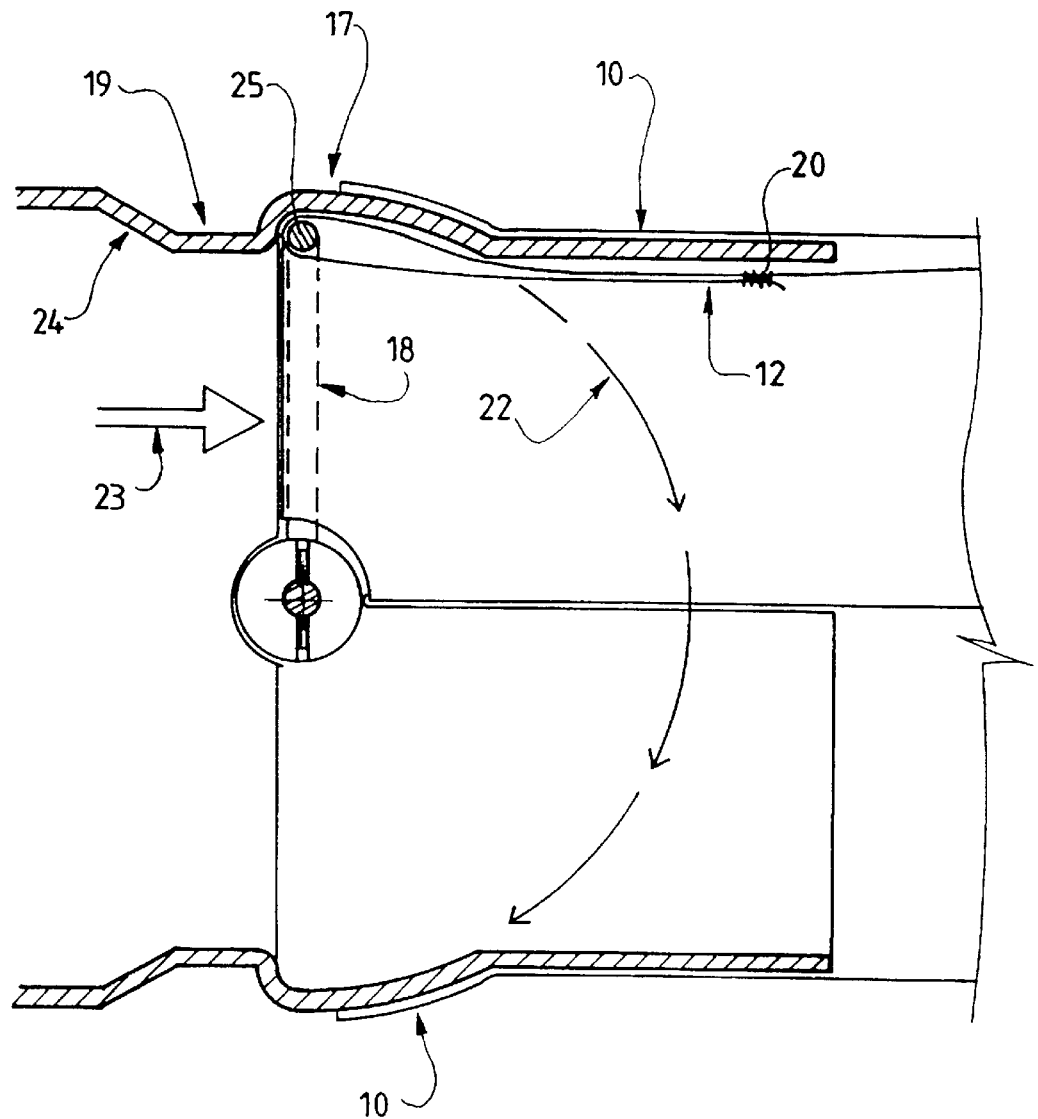
FIG. 6 illustrates a section view of a diverter valve fitted to a pipe.
Figure 7:
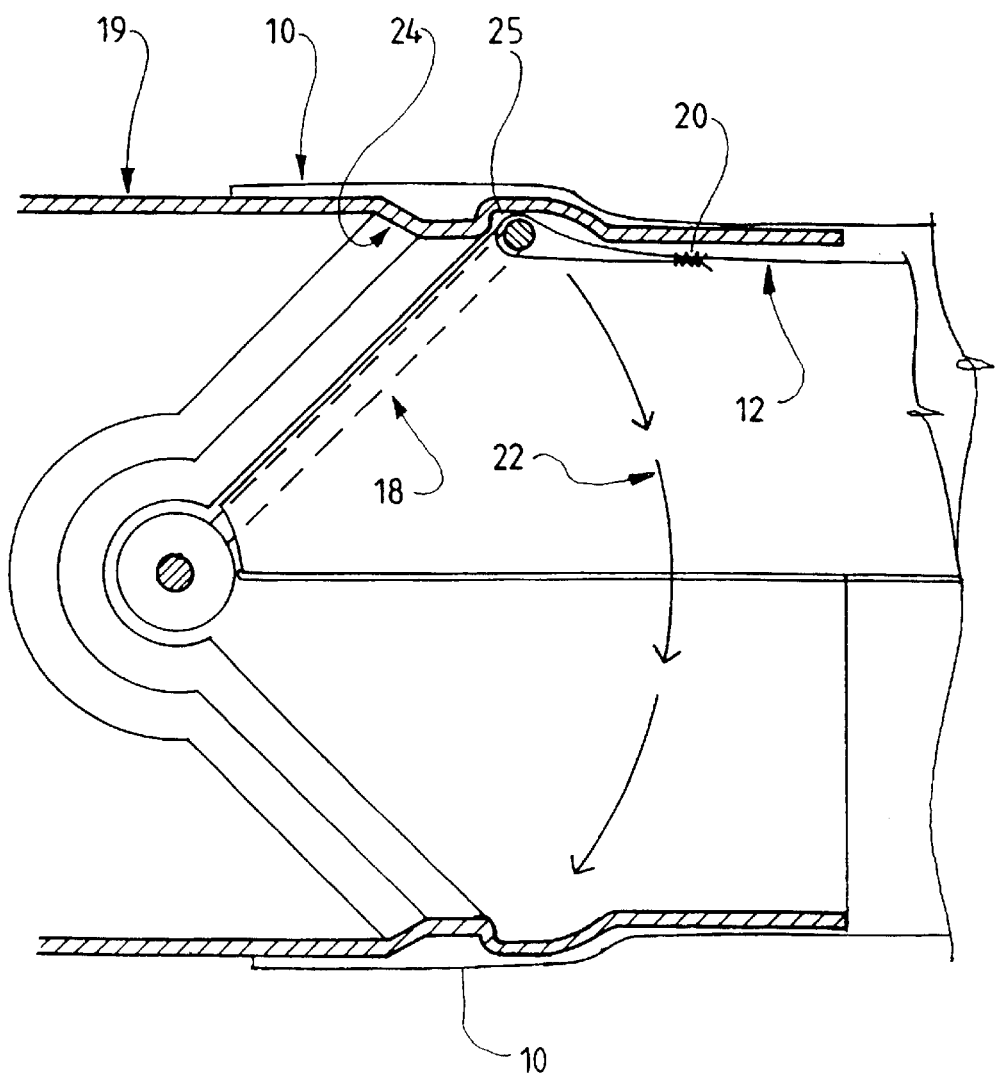
FIG. 7 shows a diverter valve of slightly different design fitted to a pipe.

Referring to FIGS. 6 and 7, there are shown two slightly different diverter valves which function in the same way. Referring initially to FIG. 6, diverter valve 17 has an outer rigid tubular wall 19, and one end of the flexible pipe 10 is attached to wall 19 either by a clamp, by welding, or any other suitable means. Once attached, the internal wall 12 is looped around an edge of valve member 18 and fastened by any suitable method at 20.

Valve member 18 can be manually moved via an external handle 21 (see FIG. 5) between an upper position illustrated in FIGS. 6 and 7, and a lower position where valve member 18 has been rotated in the direction of arrow 22 to a lower position. As valve member 18 moves, it will move wall 12 between an upper position illustrated in FIGS. 6 and 7 and a lower position (not shown). In the upper position illustrated in FIGS. 6 and 7, water flows in the direction of arrow 23 along one side of wall 12, while when in the lower position, water flows again in the direction of arrow 23 along the other side of wall 12.

In the embodiment, diverter valve 17 has a flow portion 24 which functions to redirect water flow away from the edge portion 25 of valve member 18 to prevent water from passing along the wrong side of wall 12.

Figure 8:
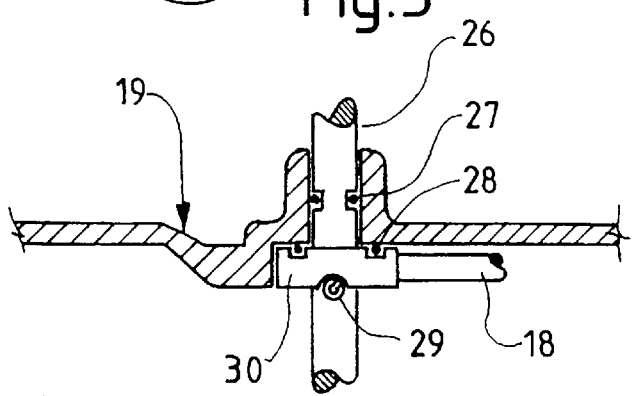
FIG. 8 shows a sealing arrangement in the diverter valve.

FIG. 8 shows a sealing arrangement. Referring to FIG. 8, there is illustrated wall 19 of diverter valve 17, a portion of valve member 18, an axle 26, "O" ring seals 27, 28, a split pin 29, and collar 30.

The flexible pipe allows internal wall to be simply moved from side to side to seal all openings 11 thereby doing away with the requirement to separately shut off each opening. The diverter valve 17 is a simple yet reliable mechanism to move internal wall 12 between its positions.

Figure 9:
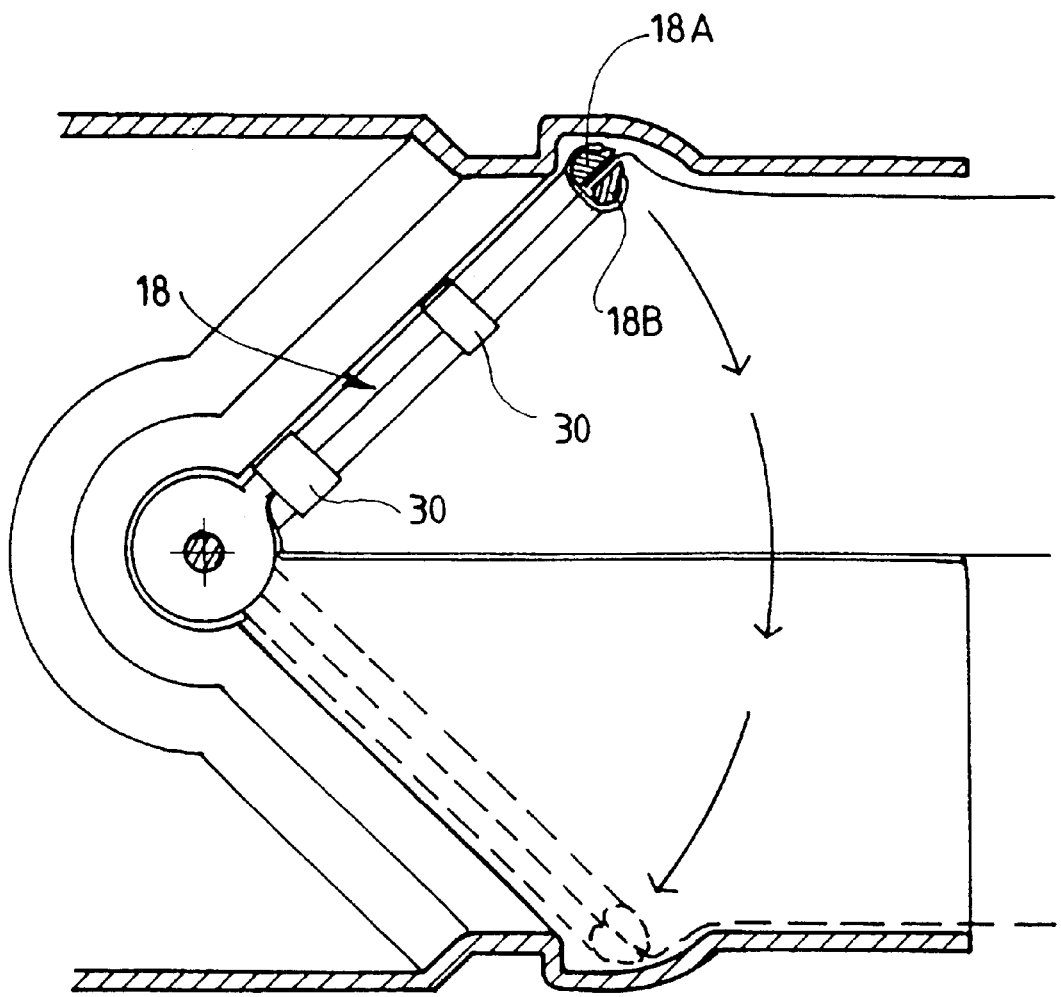
FIG. 9 illustrates another diverter valve.
Figure 10:
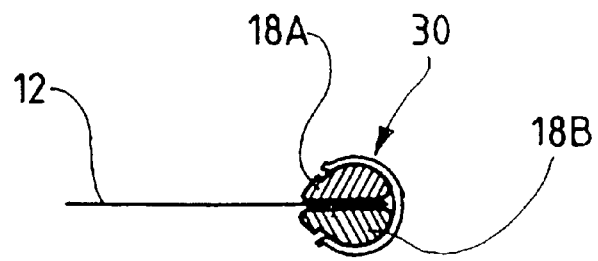
FIG. 10 shows how the divider wall is attached to the arm of the diverter valve of FIG. 9.

FIGS. 9 and 10 show a valve member 18 formed from two parts 18A, 18B (see FIG. 10), between which can be sandwiched dividing wall 12. Spring clips 30 are used to hold parts 18A, 18B together.

It should be appreciated that various other changes and modifications may be made to the embodiment described without departing from the spirit and scope of the invention.

What is claimed is:

1. A pipe to convey a fluid, comprising an inlet and at least one fluid outlet along its length, the pipe having an internal flexible longitudinal dividing wall movable between a first flow position where fluid can pass along the pipe and through the at least one fluid outlet and a second position where fluid is unable to pass through the at least one outlet, a first flexible tubular member and a second flexible elongate rectangular sheet member where the longitudinal edges of the sheet member are attached to the exterior of the first flexible tubular member at spaced apart positions wherein the sheet member encloses a minor arc of the first flexible tubular member in a fluid tight manner leaving a major arc of the tubular member unenclosed such that the sheet member and the major arc of the tubular member define an outer wall of the pipe and the minor arc of the tubular member is the internal dividing wall.

2. The pipe of claim 1, having a multiplicity of said fluid outlets spaced along the pipe.

3. The pipe of claim 1, wherein the dividing wall seals against the at least one fluid outlet when in the second position.

4. The pipe of claim 1, wherein a diverter valve is attached to the inlet side of the pipe, the diverter valve being able to move the dividing wall between its said first flow position and said second position.

5. The pipe of claim 4, wherein the diverter valve has a valve member which is attachable to an end of the dividing wall and which can move the end of the dividing wall between opposed sides of the pipe, thereby allowing fluid to selectively pass along each side of the dividing wall between the said first flow position and the said second position.

6. A diverter valve for a pipe to convey a fluid, the pipe having an inlet and at least one fluid outlet along its length, the pipe having an internal flexible longitudinal dividing wall which can move between a first flow position where fluid can pass along the pipe and through the at least one fluid outlet and a second position where fluid is unable to pass through the at least one outlet, and a diverter valve which is attached to the inlet side of the pipe, the diverter valve being able to move the dividing wall between its said first flow position and said second position.

7. A pipe to convey a fluid, the pipe having an inlet and at least one fluid outlet along its length, the pipe having an internal flexible longitudinal dividing wall movable between a first flow position where fluid can pass along the pipe and through the at least one fluid outlet and a second position where fluid is unable to pass through the at least one outlet the pipe comprises a flexible outer wall and the internal flexible longitudinal dividing wall, wherein said internal flexible longitudinal dividing wall is connected to said outer wall at two spaced locations to separate the inner surface of the outer wall into two arcs.

8. The pipe of claim 7, wherein said two spaced locations are substantially diametrically opposed.

9. A pipe to convey fluids, comprising:

an outer wall having an inner surface, an inner flexible wall attached to the inner surface of said outer wall at two spaced locations, said inner flexible wall dividing the inner surface of said outer wall into a first arc and a second arc, and a fluid outlet in said second arc wherein said inner flexible wall has a first position covering said first arc and a second position covering said second arc.

10. The pipe of claim 9, wherein said second arc and inner flexible wall are formed from a tubular member and said first arc is formed by a sheet attached to the exterior of the tubular member at two spaced apart location.

11. The pipe of claim 9, wherein said inner flexible wall seals against the fluid outlet.

12. The pipe of claim 9, further comprising a diverter valve for moving said inner flexible wall from said first position to said second position.

* * * * *